Patented Apr. 23, 1946

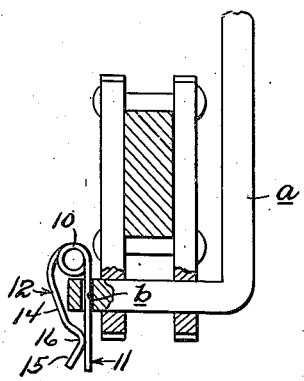
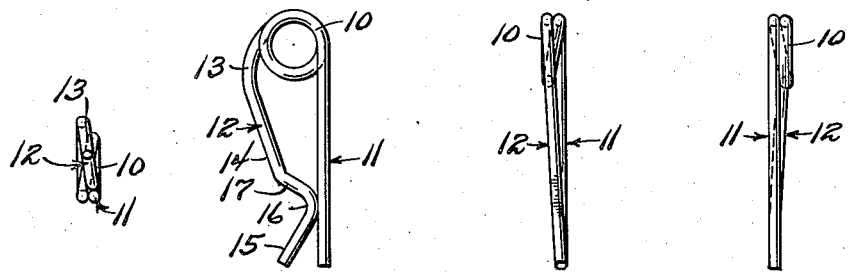
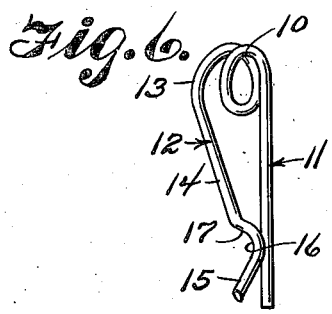

2,399,119

UNITED STATES PATENT OFFICE 2,399,119

ATTACHABLE KEY

Joe S. Howell, Jennings, Fla.

Application May 18, 1944, Serial No. 536,141

1 Claim. (Cl. 85—8.5)

This invention appertains to a fastening or locking means of the cotter pin type.

Ordinarily, a cotter pin is a split pin of annealed iron or brass, a single length of stock from which it is formed being bent to provide two closely parallel extremities of substantially equal length extending from a connecting circular portion or eye. The extremities are semi-circular in cross-section, so that, when they are together they form a shape which is readily passed through a circular opening. When engaged with an opening, the free ends of the extremities are forcibly spread apart to secure the pin against accidental displacement from any cause. To remove such a fastening, the spread ends must be forcibly straightened, so that the dual bending of the stock, involved in pin emplacement and removal, often results in breaking off of these ends and thereby rendering the fastening useless. Also, the applying and removal of this form of cotter pin requires an expenditure of an objectionable amount of time and effort, with an accompanying annoyance in the event of breakage of the extremities during the spreading and straightening operations.

It is, therefore, the primary object of the instant invention to provide a pin fastening that may readily be employed as a substitute for the ordinary form of cotter pin and which is adapted for quick attachment, and an equally quick detachment, with a minimum of effort and without any bending or other distortion of the stock from which it is made.

Another object of the invention has to do with the provision of a fastening of this character, which is extremely simple in design and construction, durable and efficient in use, and capable of being manufactured in quantity at a comparatively low cost.

With these and other objects in view, the invention resides in the certain new and useful construction that will be hereinafter more fully described, set forth in the appended claims, and illustrated in the accompanying drawing, in which:

Figure 1 is an elevation, partly in section, of a structural assembly, showing an application of the improved fastening element, in accordance with the invention;

Figure 2 is a bottom end view of the fastening element per se;

Figure 3 is an enlarged detail view thereof;

Figure 4 is another detail view but showing the fastening element displaced angularly ninety degrees from its position as in Figure 3;

Figure 5 is a view similar to that of Figure 4, but showing the fastening element displaced angularly one hundred and eighty degrees from its position as in Figure 4; and Figure 6 is a detail perspective view.

Referring to the drawing, the embodiment of the fastening element, as it is exemplified therein, is comprised in a body formed from a single length of spring steel wire that is shaped, by bending, to provide a substantially one and a half convolution resilient coil 10 intermediate end portions or extremities 11 and 12 of appreciable length and extending tangentially in the same general direction from opposite sides of the coil.

The end portion 11 is straight and as shown in Figure 1 is adapted to be passed through an aperture $b$ formed adjacent an end of a structural element $a$, thus constituting a lock pin to secure the structural element against unintended displacement from its operative position, while the end portion 12 takes a shape that its inner connected portion is slightly bowed in an outward direction, as at 13, to extend over and about the apertured end of the structural element $a$ where it merges into a substantially straight portion 14 that is directed angularly inward to a point of meeting, or nearly so, with the near side of the lock pin 11. This straight portion 14 merges into an out-turned hook-like end portion 15, at its point of meeting with the lock pin 11, the inner angled connected portion of which preferably has substantial bearing against the opposed side of the lock pin 11, so that with the latter and the spring coil 10 a substantially closed loop is provided about the apertured end of the structural element $a$ and the lock pin 11 is positively held against displacement from the aperture $b$. To disengage the lock pin 11, the hooked portion 15 is sprung outwardly and away from the lock pin beyond the plane of the apertured end of the structural element $a$, when the lock pin will be free for withdrawal from the aperture $b$.

As best shown in Figures 2, 4 and 5, the coil 10 is so formed that the end portions 11 and 12 are oppositely and inwardly angled to dispose their outer end portions in a common plane, thus permitting the hook portion 15, of the end portion 12, to have the desired bearing on the end portion 11. Also, as shown in Figures 3 and 6, the inner connected end of the hook portion 15 is sharply curved, as at 16, at its point of bearing against the lock pin 11 and this curved portion is preferably connected to the straight portion 14, of the end portion 12, by a short sharply angled straight portion 17 which, in its angular relation with respect to the lock pin 11, gives maximum tensioning effect to the coil 10 and the bowed portion 13 in their combined urge of the hooked portion 15 toward the lock pin 11.

In use, with the fastening element thus constituted operatively engaged with a structural element, such as the member A of Figure 1, the lock pin 11 is to be readily and easily removed by springing the hooked end 15, of the end portion 12, away from its bearing on the lock pin sufficiently for it to clear the end of the structural element A and, with a pulling effort exerted on the coil 10, laterally with respect to the structural element, the lock pin can be withdrawn from the aperture b, when the structural element will be freed for its removal from operative position.

What I claim is:

A fastening element comprising a body formed of a single length of spring steel stock, circular in cross-section, bent to provide a substantially one and a half convolution resilient coil spring intermediate its end portions, said end portions extending from said coil in the same general direction tangentially from opposite points on the circumference of said coil, one of said end portions being straight and constituting a lock pin adapted to be inserted through an aperture formed in the end of a structural element, the other of said end portions outwardly bowed from its point of connection with the coil spring and thereafter angularly bent inwardly and then outwardly and disposed relatively to the lock pin to leave its free end assuming the shape of an outturned hook the bend adjacent said free end being urged into substantial contact with said straight end portion by the tensioning effort of the coil spring.

JOE S. HOWELL.